US008732132B2

(12) United States Patent
Adams et al.

(10) Patent No.: US 8,732,132 B2
(45) Date of Patent: May 20, 2014

(54) LIFE MOMENT TAGGING AND STORAGE

(75) Inventors: Akitha M. Adams, Seattle, WA (US); Adrian Mark Chandley, Sammamish, WA (US); Carl J. Ledbetter, Mercer Island, WA (US); Dale Clark Crosier, Kirkland, WA (US); Pasquale DeMaio, Bellevue, WA (US); Steven T. Kaneko, Medina, WA (US); Taryn K. Beck, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 12/165,190

(22) Filed: Jun. 30, 2008

(65) Prior Publication Data

US 2008/0270715 A1    Oct. 30, 2008

Related U.S. Application Data

(62) Division of application No. 10/912,947, filed on Aug. 6, 2004, now abandoned.

(51) Int. Cl.
*G06F 17/00* (2006.01)
*G06F 7/00* (2006.01)

(52) U.S. Cl.
USPC ........... 707/661; 707/662; 707/663; 711/161; 711/162

(58) Field of Classification Search
USPC ............ 707/600–831, 899, 999.001–999.206
See application file for complete search history.

(56) References Cited

U.S. PATENT DOCUMENTS

| 4,441,163 | A | * | 4/1984 | Leikam et al. | ................... 710/54 |
| 5,214,783 | A | * | 5/1993 | Lips et al. | ..................... 711/100 |
| 5,950,195 | A | * | 9/1999 | Stockwell et al. | .................... 1/1 |
| 6,044,450 | A | * | 3/2000 | Tsushima et al. | ............... 712/24 |
| 6,256,634 | B1 | * | 7/2001 | Moshaiov et al. | .................... 1/1 |
| 6,564,309 | B1 | * | 5/2003 | Fuin | ............................. 711/168 |
| 6,594,765 | B2 | * | 7/2003 | Sherman et al. | ................ 726/35 |
| 6,665,824 | B1 | | 12/2003 | Ruhlen et al. | .................... 714/57 |
| 7,028,253 | B1 | | 4/2006 | Lieberman et al. | ........... 715/512 |
| 7,328,366 | B2 | * | 2/2008 | Michelman | .................... 714/6.3 |
| 2001/0054128 | A1 | * | 12/2001 | Sezaki et al. | .................. 711/103 |
| 2002/0126323 | A1 | * | 9/2002 | Dow et al. | ..................... 358/473 |
| 2002/0157015 | A1 | | 10/2002 | Gilbert et al. | ................. 713/200 |

(Continued)

OTHER PUBLICATIONS

Malkhi, D., "From Byzantine Agreement to Pratical Survivability", *IEEE Computer Society, Proceedings 21st IEEE Symposium on Reliable Distributed Systems*, 2002, 374-379.

(Continued)

*Primary Examiner* — Angelica Ruiz
(74) *Attorney, Agent, or Firm* — John Jardine; Andrew Sanders; Micky Minhas

(57) ABSTRACT

A secure memory device and method for obtaining and securely storing information relating to a life moment is disclosed. In the method, a parameter is received and inputted in a search heuristic. A search is made for the information according to the search heuristic and, upon finding the information, metadata is appended to the information. The information and metadata is then stored in a secure memory location. The secure memory location has a housing fabricated to withstand a predetermined stress, a detachable connection to a computer and a memory that stores the information and protects it from unauthorized deletion. In some embodiments, the stored information may be selectively deleted in a safe and controlled manner.

12 Claims, 4 Drawing Sheets

(56) References Cited

U.S. PATENT DOCUMENTS

| | | | | |
|---|---|---|---|---|
| 2003/0099254 | A1* | 5/2003 | Richter | 370/466 |
| 2003/0217034 | A1* | 11/2003 | Shutt | 707/1 |
| 2004/0042436 | A1* | 3/2004 | Terry et al. | 370/341 |
| 2004/0049479 | A1 | 3/2004 | Dorne et al. | 707/1 |
| 2004/0059920 | A1 | 3/2004 | Godwin | 713/183 |
| 2004/0064631 | A1 | 4/2004 | Kishon et al. | 711/100 |
| 2004/0098584 | A1* | 5/2004 | Sherman et al. | 713/168 |
| 2004/0172383 | A1* | 9/2004 | Yoshida et al. | 707/2 |
| 2004/0199511 | A1* | 10/2004 | Fujisawa et al. | 707/9 |
| 2004/0215840 | A1* | 10/2004 | Shimura | 710/1 |
| 2004/0267996 | A1* | 12/2004 | Hammarlund et al. | 710/200 |

OTHER PUBLICATIONS

Lynch, C., "Canonicalization: A Fundamental Tool to Facilitate Preservation and Management of Digital Information", *D-Lib Magazine*, Sep. 1999, 5(9), 9 pages.

Papiani, M. et al., "An Architecture for Archiving and Post-Processing, Large, Distributed, Scientific Data Using SQL/MED and XML", *Advances in Database Technology, EDBT*, 2000, 1777, 447-461.

Riesmeier, J. et al., "Authentication, Integrity and Confidentiality in DICOM Structured Reporting: Concept and Implementation", *Proceedings of the SPIE—The International Society for Optical Engineering*, 2002, 4685, 270-279.

Pintea, J., "Document Flow Control and Corporate Archives Management Systems: Facts, Goals, Approach", *IDT, 13$^{th}$ Conference Proceedings*, 1996, 196-200.

Pozgaj, S., "An Archiving System for Library Maintenance", *The Insertion of Data Processing a Key to Success*, 1978, Part I, 211-221.

Seaman, R., "FITS Checksum Verification in the NOAO Archive", *Astronomical Data Analysis Software and Systems IV*, 1995, 77, 247-250.

"Presence sensing: The Productive Solution to Machine Guarding", *SME Technical Paper*, 1985, MF85-166-MF85-166-9.

\* cited by examiner

LIFE MOMENT TAGGING AND STORAGE

CROSS-REFERENCE TO RELATED APPLICATIONS

This is a divisional of, and hence claims priority to, U.S. application Ser. No. 10/912,947, filed Aug. 6, 2004, the content of which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates to electronic data selection and storage. More particularly, the present invention relates to the intelligent selection of data representing events that are significant to the user. Even more particularly, the present invention relates to storing such data in a secure data repository.

BACKGROUND OF THE INVENTION

The public is becoming more and more dependent on the personal computer (PC) as a place to store their important documents and memories. For example, photography has evolved from its paper and chemical beginnings to the electronically-stored digital images that are commonly used today. Digital photographs are typically transferred to a PC for printing and/or for long-term storage to free up memory resources on the digital camera. In addition, other important items such as legal documents, bills, and so forth, are now provided to users and stored electronically.

One of the benefits of storing data electrically is that the data can be transmitted, copied or deleted easily. When storing electrical information such as digital photographs, however, this benefit can become a problem. For example, some photographs are very valuable to a user because they pertain to a significant life moment (e.g., weddings, births, graduations, etc.). Electrically stored information, however, is quite susceptible to accidental or malicious problems. For example, a user could accidentally delete or write over the photographs, or accidentally render them inaccessible. In addition, a malicious party—by way of a virus or the like—could gain access to the photographs or may cause damage to the PC to the extent that the photographs are irretrievable.

As a result, the typical user would prefer to store the photographs in a manner that is at least as safe as storing the information in a conventional manner. For example, conventional photographs can be stored in a fire safe or at another family member's house; and a box of photographs is something that can easily be retrieved in event of a fire or flood.

Another problem with conventional methods of electrical information storage is that transportable storage media are not very protective of the information. A conventional method for storing electrical information in a transportable form is to save such information to a removable disk or CD-ROM. However, such media are neither fire-safe nor very secure, and are also not physically robust. For example, a CD-ROM is brittle and relatively delicate, and a removable disk is typically susceptible to accidental erasure when subject to magnetic fields. In contrast, a photo album for conventional photographs physically protects the information contained therein (i.e., the photographs) and is also easily transportable. Thus, what is needed is such a secure and physically robust device for storing electrical information.

In addition, with the proliferation of the Internet and other electronic communications systems, it is possible to access an enormous amount of information. In conventional photography and other media, it is common to create photo albums, or the like, of certain events. Sometimes, it is desirable to place additional information such as news clippings to provide a historical context for the event captured in the photographs. Conventionally, a user that wishes to include such historical information in an electronic format independently searches for the information to download and store for display with digital photographs and the like. Presently, there is no suitable method for identifying and retrieving such information in a manner that can be automatically tailored to a particular life moment to effectively create a life album or the like. In addition, there is no acceptable way of securely storing such information once it is retrieved.

Accordingly, in light of the above shortcomings and drawbacks, what is needed is a method for electronically identifying and retrieving specified, significant life events. More particularly, what is needed is method for storing such identified life events in a specialized, secure location that resists deletion or destruction.

SUMMARY OF THE INVENTION

In view of the above shortcomings and drawbacks, secure memory device and method for obtaining and securely storing information relating to a life moment is disclosed. In the method, a parameter is received and inputted in a search heuristic. A search is made for the information according to the search heuristic and, upon finding the information, metadata is appended to the information. The information and metadata is then stored in a secure memory location. The secure memory location has a housing fabricated to withstand a predetermined stress, a detachable connection to a computer and a memory that stores the information and protects it from unauthorized deletion.

In some embodiments, the stored information may be selectively deleted in a safe and controlled manner. In such an embodiment, an instruction to delete the information stored in a memory is received, and a user is prompted for confirmation of the instruction. If the confirmation is received, the instruction is queued for a predetermined waiting period. At the completion of the predetermined waiting period, the information is deleted from the memory according to the instruction.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

An embodiment of the present invention provides a secure memory device and a search methodology for procuring information pertaining to a life moment or other significant event. In one embodiment, the secure memory device is a physically robust memory device that is transportable and has deletion controls. In another embodiment, the secure memory device is a secure memory location that may be provided by way of a network or the like. As will be discussed in greater detail below, the deletion controls may be in the form of a write-only mechanism with no deletion capability, a time-delayed deletion feature, a transfer-only function, or the like.

As noted above, an embodiment also provides for a search methodology for obtaining information relating to a life moment. The method, in an embodiment, uses a heuristic based on an input by a user to identify relevant information and then retrieves the information and stores it in the secure memory device or location. The search method thereby facilitates the incorporation of information from a variety of data sources such as, for example, the Internet and the like. Before discussing the invention in detail, we will first describe exemplary computing and network environments in which the invention may be advantageously practiced.

Exemplary Computing Environment

Figure 1:
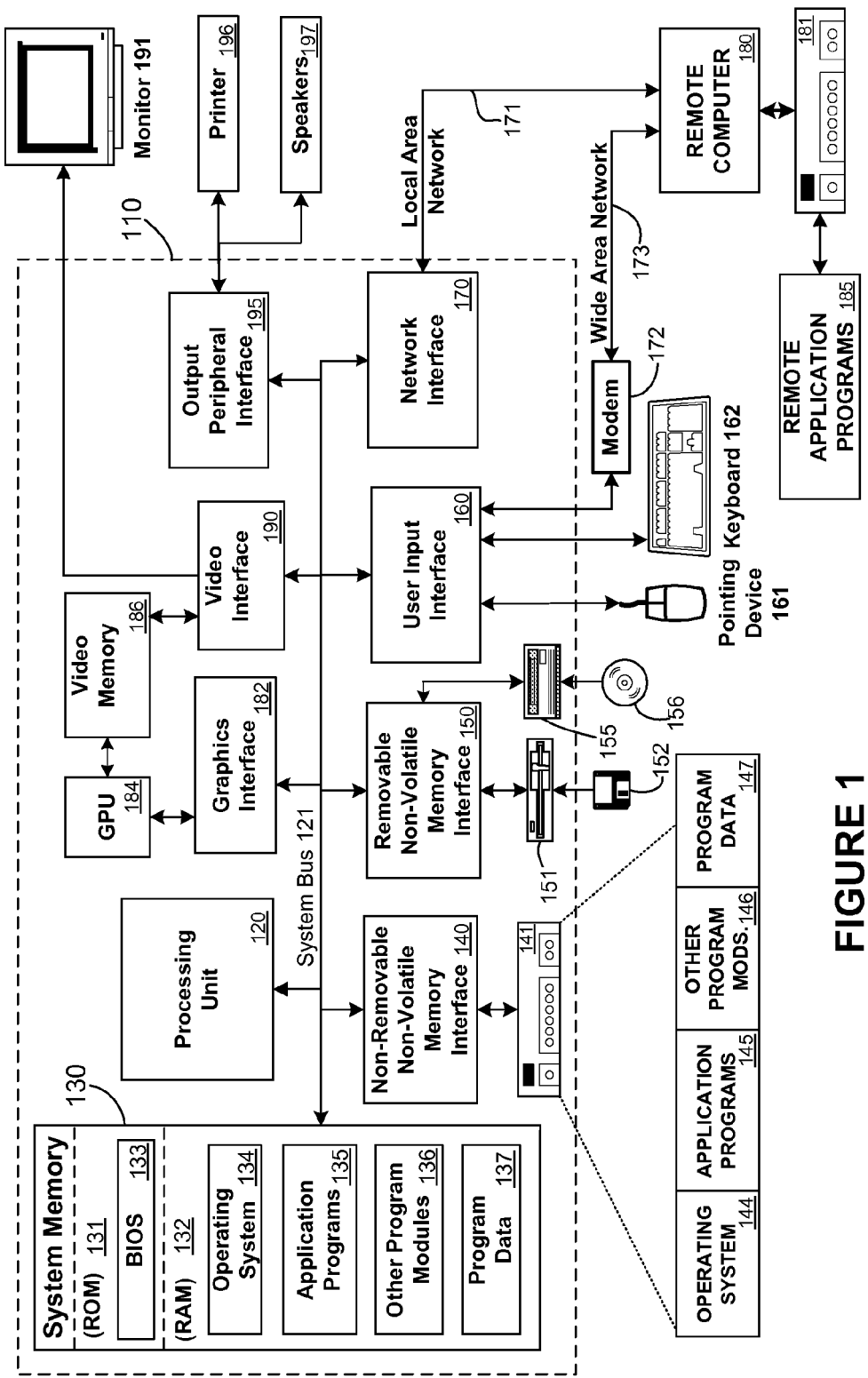
FIG. 1 is a diagram illustrating an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

DESCRIPTION OF EMBODIMENTS OF THE PRESENT INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 2:
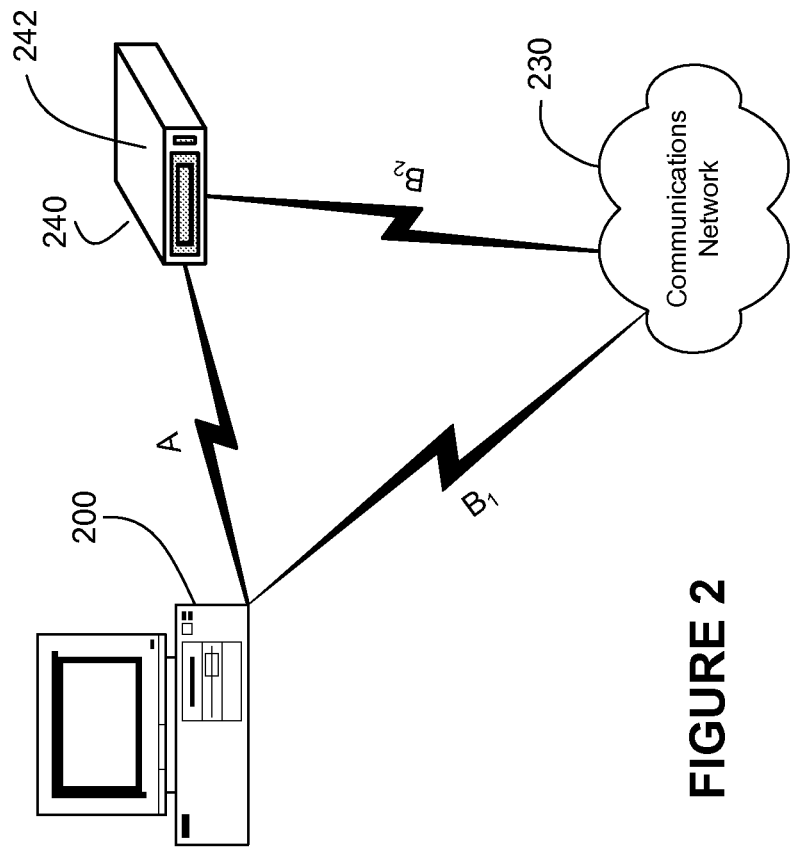
FIG. 2 is a diagram illustrating an exemplary device configuration in which aspects of embodiments of the present invention may be incorporated.

FIG. 2 illustrates an exemplary device configuration in which an embodiment of the present invention may be employed. Of course, devices may be arranged in a variety of configurations; however, the exemplary configuration shown herein provides a framework for understanding the types of configurations in which an embodiment may operate. In FIG. 2, the configuration may include one or more computers 200, which may be configured as computer 110 as was discussed above in connection with FIG. 1.

The computer 200 is in electronic communication with the secure memory device 240 by way of the communications link A. Alternatively, or in addition, the computer 200 can be in electronic communication with the secure memory device 240 by way of communications links $B_1$ and $B_2$. It can be seen in FIG. 2 that communication link $B_1$ operatively connects the computer 200 to a communications network 230 (e.g., LAN, WAN, Intranet, Internet, or the like). Likewise, the communications link $B_2$ operatively connects the communications network 230 to the secure memory device 240. It will be appreciated that the communications links $B_1$ and $B_2$ can be any type of communications interfaces such as Ethernet connections, modem connections, wireless connections and so on.

The secure memory device 240 has a housing 242 that, in an embodiment, is hardened to withstand predetermined levels of physical stress. For example, the housing 242 may be able to withstand a fall from a predetermined height, a fire up to a temperature and/or time limit, and the like. It will be appreciated that any method of fabricating such housing may be used while remaining consistent with an embodiment of the present invention. For example, any hardened material that is suitable for use as the housing 242 may be used. It will also be appreciated that in an embodiment the memory component(s) of the secure memory device 240, which are not illustrated in FIG. 2A for clarity, are adapted to be able to sufficiently withstand any stresses that are not completely mitigated by the housing 242. For example, if the secure memory device 240 falls from a certain height, the memory component(s) should be able to withstand any deceleration and shock that may result from the impact.

As noted above, in an embodiment the secure memory device 240 is operatively connected to the computer 200 by way of communication link A, and/or communications links $B_1$ and $B_2$ by way of communications network 230. The operative connection may be wireless or may use a wired connection. In some embodiments using a wired connection, the connection to the secure memory device 240 is easily detachable, so the secure memory device 240 may be quickly and easily removed in the event of an emergency. Thus, the secure memory device 240 provides a physically-robust and easily-transported means for storing electronic information.

In an embodiment, the secure memory device 240 is configured to freely permit the addition and reading of information on the device 240, but to reject attempts to modify, overwrite or delete such information. The information may be deleted in some embodiments if sufficient safeguards are present. An exemplary method for safely deleting such information is discussed below in connection with FIG. 4.

The safeguarding of the data can be performed in any number of ways while remaining consistent with an embodiment of the present invention. For example, the technology used to prevent alteration of the information should not be configurable by software to prevent accidental or malicious destruction. In an embodiment, the hardware functionality could be instantiated by way of firmware, such as a hard disk drive with specific firmware, through hardware that is "write once" or "append only," such as the case with certain optical drives or non-volatile memory, or the like.

A file system used in such a secure memory device 240 would, in an embodiment, need to allow the addition of new data and new directory entries without requiring the rewriting of any previously written information in the device 240 (for example, the directory itself should not be overwritten, just augmented or superseded). File systems such as those used for write once media such as CD-R or DVD-R may be used in an embodiment of the present invention. A user Definable Function (UDF) is one example of such a file system, and other types of file systems such as file system structures designed for linear media, such as backup tapes and "log structured" file systems, may also be used in connection with an embodiment. Additional or future versions of a file could be stored as additional files so the initial file and any intermediary versions would remain unchanged. The use of a non-overwriting file system in an embodiment therefore provides a user with a means for inspecting the contents of the secure memory device 240 as such contents existed at any point in time between the time when the contents were first stored, up until the current time.

As noted above, a user may wish to find information relating to a life moment for inclusion in a life album or the like. In one embodiment, the conventional news "clipping" of the past is updated to take advantage of the enormous amounts of data available on the Internet and in other data sources. It will be appreciated that any type of event—whether related to the user's personal life, business achievements, or the like—may be considered a "life moment." One or more of such life moments, along with any additional information, may be stored together to form a life album. It will be appreciated, however, that the method 300 is not limited to the creation of such a life album.

Figure 3:
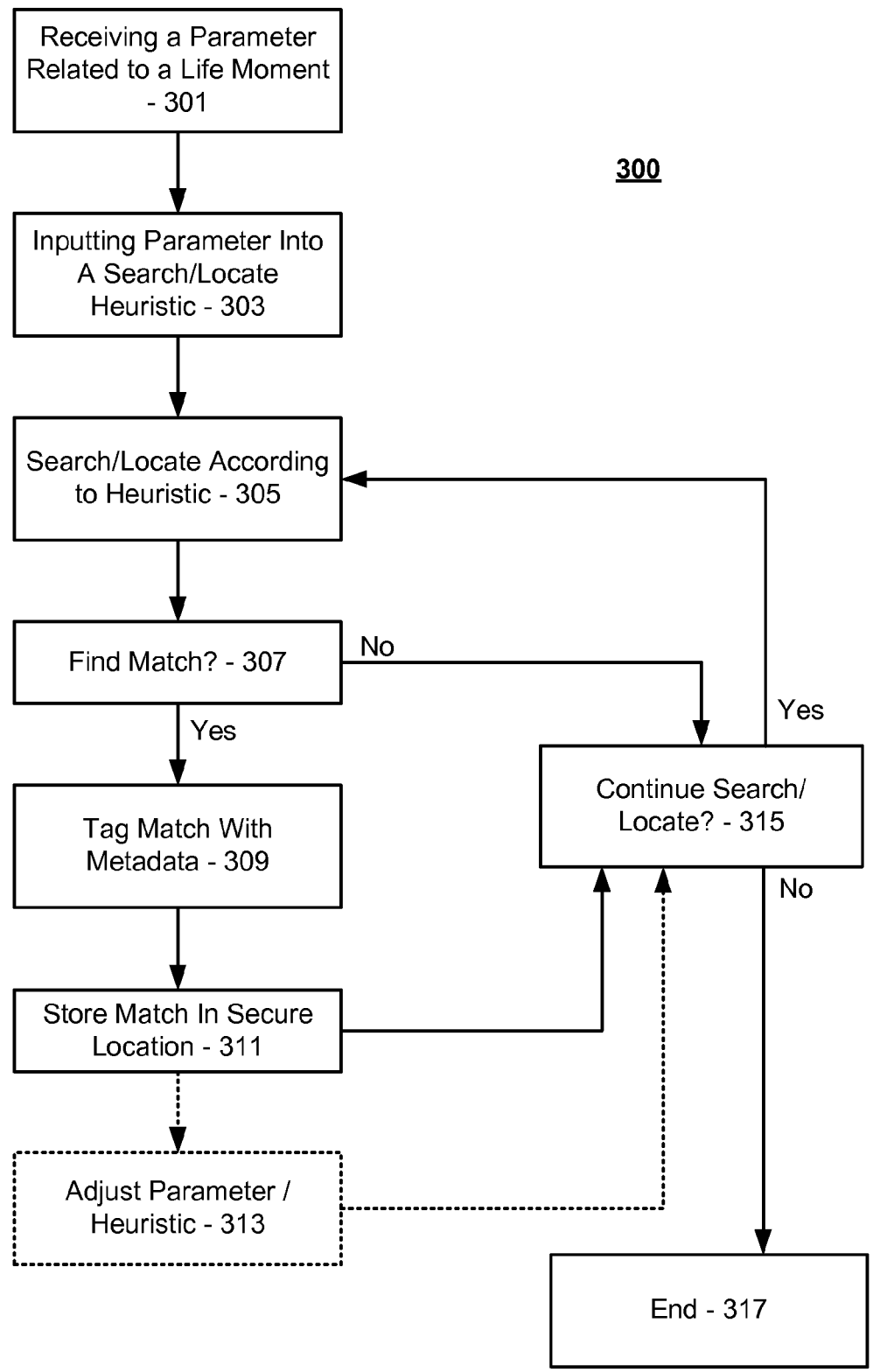
FIG. 3 is flowchart illustrating an exemplary method of locating and storing a life moment according to an embodiment of the present invention.

Thus, FIG. 3 is flowchart illustrating an exemplary method 300 of locating and storing information relating to a life moment according to an embodiment of the present invention. It will be appreciated that the method 300 may be performed by the computer 200 as discussed above in connection with FIG. 2, or by other computing device(s) that are in operative communications with the secure memory device 240. In addition, the method 300 may be performed by any number of computing devices.

At step 301, a parameter related to a life moment is received. It will be appreciated that such a parameter may be a search term, subject, date, event description or the like. At step 303, the received parameter is input into a search heuristic. The search heuristic may be specifically adapted for the type of life moment for which the search is performed, or the search heuristic may be a general heuristic that may be adapted for use in a variety of situations. It will be appreciated that any heuristic that provides acceptable results may be used. It will also be appreciated that the heuristic may use feedback and other techniques to refine its search methods so as to return more relevant results.

At step 305, a search is performed according to the heuristic. The search may be of a computer network such as, for example, the Internet, or the like. The search may take place on-demand, or may be ongoing "in the background" of computer operations. For example, the search may be performed periodically with or without additional user input. Alternatively, the search may be performed continuously while other computing functions are being performed. In some embodiments, the search is carried out by a stand-alone program, while in other embodiments the search is carried out by one or more Application Program Interfaces (APIs) that are working in concert with one or more programs.

At step 307, a determination is made as to whether a match has occurred, thereby indicating that information related to the search parameter has been found. If no matches have been found, the method 300 proceeds to step 315 where a determination is made as to whether the search should continue. For example, a time limit may have expired, or a user may desire to perform another search. If the search should not continue, the method 300 ends at step 317, as will be discussed below. If the search is to continue, the method 300 continues searching at step 305. It will be appreciated that the method 300 may, if the determination of step 315 is to continue searching, request one or more additional search parameters, may refine the search heuristic with or without further user input, or the like.

If the determination of step 307 is that a match has occurred, thereby indicating that information related to the search parameter has been found, the method 300 proceeds to step 309. At step 309, the match is tagged with metadata. The metadata relates to, for example, the search parameter, the life moment to which the match relates (e.g., the birth of a child, etc.), the time of the search, and/or the like.

At step 311, the match is stored in a secure location such as, for example, the secure memory device 240 as discussed above in connection with FIG. 2. The method 300 may then proceed to step 315, as discussed above, or to optional step 313. At optional step 313, the parameter and/or heuristic is adjusted. It will be appreciated that such an adjustment may be to better locate a match for the present search, or the adjustment may be to improve the performance of the method 300 in future searches. Any such configuration is equally consistent with an embodiment of the present invention. At step 317, the method 300 ends. It will be appreciated that at step 317 the method 300 may return to step 301 to perform an additional search, or the like.

As noted above in connection with the discussion of FIG. 2, the information, one stored in a secure location such as the secure memory device 240, may remain safely stored in such a location indefinitely. On some occasions, however, a user may wish to delete such information. For example, the search method 300 of FIG. 3, or some other method by which information was obtained, may have stored more information in the secure location than desired by the user, and the user wishes to streamline the life album to exclude the extraneous information. Or, the user may have simply changed his or her mind as to the importance of some information, or even of the life moment itself. Therefore, some embodiments of the present invention permit deletion of some or all of the information stored in the secure location. However, and as noted above, the secure location should not freely permit deletion of information, lest the secure location become susceptible to accidental or malicious deletion of the information. Thus, an embodiment incorporates a time delay between the acceptance of a delete instruction and the carrying out of the deletion. In such a manner, a user has an opportunity to reflect on the propriety of his or her decision to delete the information. In addition, the user has an opportunity to detect deletion instructions that may have been accidentally or maliciously placed.

Figure 4:
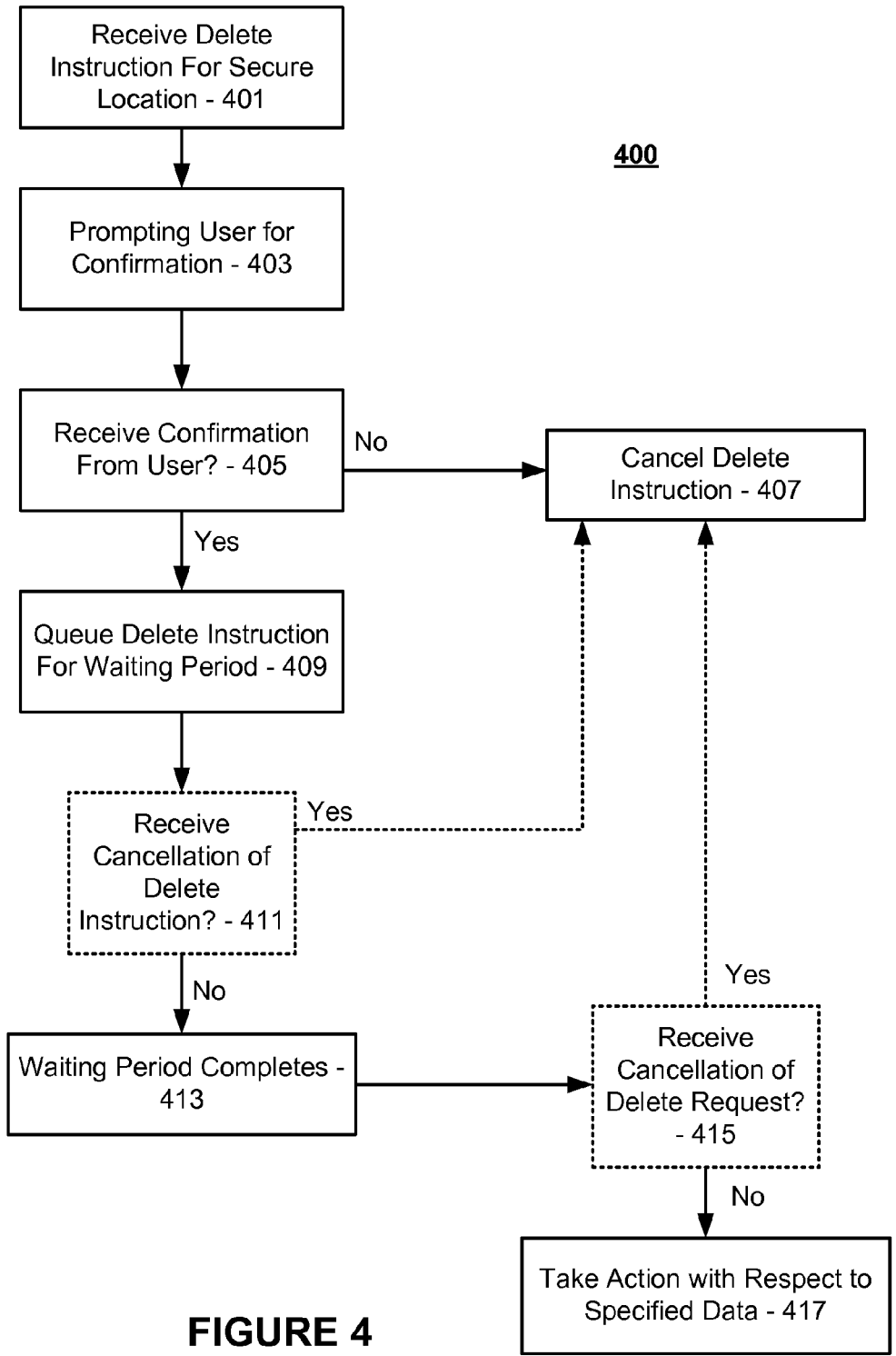
FIG. 4 is flowchart illustrating an exemplary method of deleting data from a secure data location according to an embodiment of the present invention.

Accordingly, FIG. 4 is flowchart illustrating an exemplary method 400 of deleting data from a secure location according to an embodiment of the present invention. At step 401, a delete instruction is received. It will be appreciated that step 401 may include any number of authentication or initialization steps. In some embodiments, a password or the like may need to be provided by the user before the delete instruction is accepted by the method 400. At step 403, for example, the user is prompted to confirm the delete request. The prompt may be an interrogatory such as asking the user "are you sure?" or the like. The prompt may also request additional security information and so forth.

At step 405, a determination is made as to whether a confirmation has been received from the user. If no confirmation has been received, the method 400 proceeds to step 407 where the delete instruction is canceled and the information in the secure data location is preserved without change. If the determination of step 405 is that the confirmation has been received, the method 400 proceeds to step 409 where the delete instruction is queued for a waiting period. It will be appreciated that the waiting period may be of any duration. In some embodiments, however, the waiting period is long enough to provide the user with an opportunity to cancel the delete instruction, detect an accidental or malicious delete instruction, or the like. For example, the waiting period, in an embodiment, may be on the order of days, months or even years. Alternatively, the waiting period may be indefinite. In such an embodiment, the information to be deleted is retained and is only deleted if, for example, the secure memory device 240 needs to recover storage space as the device 240 begins to be filled with data. Thus, in such an embodiment, at the completion of the method 400, the information to be deleted is merely available to be deleted, and is not necessarily deleted at the moment the method 400 is completed at step 417, below.

In an embodiment, the user may decide to cancel the delete instruction at any time prior to the end of the waiting period. Thus, at optional step 411, a determination is made as to whether a cancellation has been received. If so, the method 400 proceeds to step 407 where the delete instruction is canceled. If the cancellation is not received, the method 400 proceeds to step 413, where the waiting period completes. It will be appreciated that the determination of step 411 may occur anytime, and any number of times, before the completion of the waiting period at step 413. In addition, at optional step 415, the method 400 determines whether a cancellation has been received after the completion of the waiting period. If a cancellation has been received, the method 400 cancels the delete instruction at step 407. If not, the method 400 proceeds to step 417.

At step 417, an action is taken with respect to the information. For example, the information can be deleted, transferred, or made available for deletion. In one embodiment, the information is simply deleted once the completion of the waiting period has occurred, if no cancellation has been received. In another embodiment, the secure memory device 204 operates as "transfer-only." In other words, the secure memory device 240 in such an embodiment does not permit data to be deleted directly from the device 240 at the completion of the waiting period. Instead, the information may be transferred (or moved) to an unsecured location where the information may then be deleted or retained. In yet another embodiment, and as noted above, the information is made available for deletion at the completion of the waiting period. In such an embodiment, the information may be deleted if an additional event occurs. An example of such an event may be that the secure memory device 240 is running out of storage space and needs to reclaim the space, or the like. Thus, the information is kept as long as possible before being deleted, thereby increasing the security of the device 240.

Thus, it will be appreciated that a user may, in one embodiment, use the method of FIG. 3 to obtain information relating to a life moment and may store the information in a secure location. An example of such a secure location is the secure memory device 240 discussed above in connection with FIG. 2. The secure memory device 240 stores the information in a manner that will be appreciated to be at least as secure as storage means used for conventional photographs and the like. In addition, the method of FIG. 4 provides a user with the flexibility to delete such information stored in a secure location such as the secure memory device 240 in a safe manner that protects against accidental and/or malicious deletions.

Thus, a method and system for selecting and securely storing data pertaining to events that are significant to a user has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any type, number or configuration of electronic devices in any type of environment. Therefore, the present invention should not be limited to any single embodiment, but rather should be construed in breadth and scope in accordance with the appended claims.

What is claimed:

1. A computer-implemented method comprising:
    receiving, by one or more computer processors, a first instruction to delete information specified by a user stored in a memory;
    prompting, by the one or more computer processors, the user for confirmation of the first instruction;
    determining, by the one or more computer processors, that a confirmed delete instruction is received;
    based on determining that the confirmed delete instruction is received, queuing, by the one or more computer processors, the confirmed delete instruction for a waiting period;
    after receiving the confirmed delete instruction and prior to expiration of the waiting period, receiving, by the one or more computer processors, a second instruction to cancel the confirmed delete instruction; and
    canceling, by the one or more computer processors, the confirmed delete instruction in accordance with the second instruction.

2. The computer-implemented method of claim 1, further comprising prompting the user for security information, and performing said queuing step only if the security information is received.

3. The computer-implemented method of claim 1, wherein the memory is part of a secure memory device.

4. A computer-readable storage medium having stored thereon computer-executable instructions that, when executed by one or more processors of a computer system, cause the computer system to perform operations comprising:
    receiving a first instruction to delete information specified by a user stored in a memory;
    prompting the user for confirmation of the first instruction;
    determining that a confirmed delete instruction is received;
    based on determining that the confirmed delete instruction is received, queuing the confirmed delete instruction for a waiting period;
    after receiving the confirmed delete instruction and prior to expiration of the waiting period, receiving a second instruction to cancel the confirmed delete instruction; and
    canceling the confirmed delete instruction in accordance with the second instruction.

5. The computer-readable storage medium of claim 4, having stored thereon further computer-executable instructions that, when executed by the one or more processors of the computer system, cause the computer system to perform operations comprising prompting the user for security information, and performing said queuing step only if the security information is received.

6. The computer-readable storage medium of claim 4, wherein the memory is part of a secure memory device.

7. The computer-readable storage medium of claim 4, wherein the waiting period extends at least until storage capacity must be recovered by deleting only data associated with information specified by the user for deletion.

8. The computer-implemented method of claim 1, wherein the waiting period extends at least until storage capacity must be recovered by deleting only data associated with information specified by the user for deletion.

9. A computing device configured to perform operations comprising:
    receiving a first instruction to delete information specified by a user stored in a memory;
    prompting the user for confirmation of the first instruction;
    determining that a confirmed delete instruction is received;
    based on determining that the confirmed delete instruction is received, queuing the confirmed delete instruction for a waiting period;
    after receiving the confirmed delete instruction and prior to expiration of the waiting period, receiving a second instruction to cancel the confirmed delete instruction; and
    canceling the confirmed delete instruction in accordance with the second instruction.

10. The computing device of claim 9, wherein the computing device is further configured to perform operations comprising prompting the user for security information, and performing said queuing step only if the security information is received.

11. The computing device of claim 9, wherein the memory is part of a secure memory device.

12. The computing device of claim 9, wherein the waiting period extends at least until storage capacity must be recovered by deleting only data associated with information specified by the user for deletion.

* * * * *